United States Patent
Suga

(10) Patent No.: US 8,005,213 B2
(45) Date of Patent: Aug. 23, 2011

(54) METHOD, APPARATUS, AND COMPUTER PROGRAM FOR GENERATING SESSION KEYS FOR ENCRYPTION OF IMAGE DATA

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 11/829,299

(22) Filed: Jul. 27, 2007

(65) Prior Publication Data

US 2008/0031446 A1   Feb. 7, 2008

(30) Foreign Application Priority Data

Aug. 4, 2006   (JP) ................................. 2006-213944
Jul. 10, 2007   (JP) ................................. 2007-181450

(51) Int. Cl.
*H04L 9/14*   (2006.01)
(52) U.S. Cl. ............. 380/44; 380/46; 713/179; 713/193
(58) Field of Classification Search ............. 380/44, 380/46; 713/193, 179; 382/276, 309
See application file for complete search history.

(56) References Cited

U.S. PATENT DOCUMENTS

| | | | | |
|---|---|---|---|---|
| 6,999,587 | B1* | 2/2006 | Asano et al. ................... | 380/202 |
| 2004/0059937 | A1 | 3/2004 | Nakano | |
| 2004/0083364 | A1* | 4/2004 | Andreaux et al. ............ | 713/165 |
| 2004/0170277 | A1 | 9/2004 | Iwamura et al. | |
| 2004/0187001 | A1* | 9/2004 | Bousis ........................... | 713/175 |
| 2004/0243814 | A1* | 12/2004 | Nakano et al. ................ | 713/189 |
| 2005/0021988 | A1 | 1/2005 | Kitamura | |
| 2006/0149762 | A1 | 7/2006 | Suga et al. | |
| 2007/0058803 | A1 | 3/2007 | Suga | |
| 2007/0073937 | A1* | 3/2007 | Feinberg et al. ................ | 710/62 |
| 2007/0136599 | A1 | 6/2007 | Suga | |
| 2007/0189517 | A1* | 8/2007 | Koseki et al. ................... | 380/30 |

FOREIGN PATENT DOCUMENTS

| | | |
|---|---|---|
| CN | 1556449 | 12/2004 |
| JP | 2004-118327 | 4/2004 |
| JP | 2005-018914 | 1/2005 |

OTHER PUBLICATIONS

Chinese Office Action dated Oct. 27, 2010, issued by The State Intellectual Property Office of P.R. China, in Chinese Application No. 200710143174.3.

* cited by examiner

*Primary Examiner* — Taghi T Arani
*Assistant Examiner* — Justin T Darrow
(74) *Attorney, Agent, or Firm* — Fitzpatrick, Cella, Harper & Scinto

(57) ABSTRACT

An object of this invention is to protect the right of a content holder without any necessity of a special storage medium incorporating a copyright protecting mechanism when the content holder does not coincide with a content creator. Information for encryption key generation is input. An encryption key is generated from the information for encryption key generation. Encryption key verification data is acquired from a storage medium, and the validity of the generated encryption key is authenticated based on the verification data. Generated data is encrypted by using the encryption key whose validity is authenticated by the authentication. The encrypted data is stored in the storage medium.

13 Claims, 13 Drawing Sheets

METHOD, APPARATUS, AND COMPUTER PROGRAM FOR GENERATING SESSION KEYS FOR ENCRYPTION OF IMAGE DATA

BACKGROUND OF THE INVENTION

1. Field of the Invention

The present invention relates to an information processing apparatus, a data processing apparatus, and methods thereof and, more particularly, to a technique of protecting the right of a holder of data stored in a storage medium.

2. Description of the Related Art

The rapid growth and spread of computers and networks is promoting digitization of a variety of information such as text data, image data, and audio data and distribution of these digital data. However, distribution of digital data via a wide area network such as the Internet is fraught with danger of eavesdropping or wiretapping on the transmission path by third parties. Not only data on a transmission path but also digital data stored in a storage medium is not safe because an unauthorized third party who has no access right may copy and illicitly use and leak it. It is common practice to encrypt digital data in order to ensure a safe transmission path or securely store data in a portable storage medium.

It is easy to copy, edit, and modify digital data. The ability to copy, edit, and modify with ease is useful for users but simultaneously induces the necessity to protect digital data against illicit alteration by third parties. There are digital signatures and a message authentication code (MAC), which add anti-alteration data to verify the presence/absence of alteration of digital data. A digital signature has not only an alteration verification function but also a function of preventing spoofing and repudiation.

Cryptography to implement the above-described mechanisms will be described below.

[Hash Function]

A hash function is used together with a digital signature process to shorten the process time of signature addition by lossy-compressing data to be signed. That is, a hash function has a function of processing data M with an arbitrary length to generate output data with a predetermined length. An output H(M) of the hash function is called a hash value for the plaintext data M.

Particularly, a one-way hash function that is given the data M cannot practically be used to calculate plaintext data M' satisfying H(M')=H(M) due to amount of calculation. Examples of the one-way hash function are MD2 (Message Digest 2), MD5 (Message Digest 2), and SHA-1 (Secure Hash Algorithm 1).

[Public Key Cryptosystem]

As a characteristic feature of a public key cryptosystem using two different keys, data encrypted by one of the keys can be decrypted by only the other key. One of the two keys is called a public key and can be open to the public. The other key is called a private key and is held by only an authorized person. With this characteristic feature, one key (public key) can be open to the public. Hence, transmission of the key is easy because it is unnecessary to give it to a communication partner secretly. Examples of the public key cryptosystem are RSA encryption and ElGamal encryption.

[Digital Signatures]

Examples of digital signatures using a public key cryptosystem are an RSA signature, DSA signature, and Schnorr signature.

[Message Authentication Code]

A digital signature is a message authentication system that guarantees the right of a document creator by using a public key cryptosystem. Another message authentication system using a common key cryptosystem or a hash function instead of a public key cryptosystem is called a message authentication code (MAC).

The MAC is largely different from a digital signature in that a sender (MAC value creator) and a recipient (authenticator) share secret data (key K in keyed-hashing for message authentication code (HMAC)). It is advantageous because the amount of calculation is smaller than a digital signature. However, since the authenticator also holds the secret data, it is impossible for a third party to prove the creator of MAC, that is, sender or recipient. The MAC using a standard hash function such as SHA-1 is used for a security protocol such as IPSec (IP Security protocol) or SSL (Secure Socket Layer) in a network.

[Image Data Protection in Digital Camera]

Using the above-described cryptography or digital signatures enables protection of image data taken by a digital camera from threats such as eavesdropping or wiretapping, alteration, and spoofing.

A technique described in Japanese Patent Laid-Open No. 2005-18914 aims at protecting data recorded in a portable storage medium and implements copy protection and data encryption. More specifically, a data recording program and a data reproduction program, which can be activated by a computer, are written in a portable storage medium in advance. That is, there exists a technique of imparting a copyright protecting function to a portable storage medium.

Contents containing image data are not always distributed by using portable storage media. In another method, contents are freely distributed via a network. A technique described in Japanese Patent Laid-Open No. 2004-118327 causes a specific server administrator to control utilization of contents acquired via, for example, a network. That is, there exists a copyright protection technique of causing a device to communicate with a server and obtain a permission to use a content, assuming that the device to use the content connects to a network.

Normally, a photographer, who is a content creator, can freely delete or transfer image data he/she has taken by using, for example, a digital camera. However, a photographer is not always a holder of rights in the contents (i.e., the content owner). For example, a content owner may be is a publishing company, while a photographer is a cameraman who has a contract with the company. In this case, the photographer may transfer captured image data to third parties (other than the contracting party) erroneously or intentionally. To prevent this, it is necessary to establish a mechanism for causing an entity (content owner) different from the photographer to protect the copyright of image data.

The technique of Japanese Patent Laid-Open No. 2005-18914 encrypts image data by using special storage media. This method is disadvantageous in two points: the purchase cost of special storage media and the unusableness of existing storage media. The technique of Japanese Patent Laid-Open No. 2004-118327 requires network connection to use contents. This is not always convenient for content users.

To set right protection in a camera on a remote site, it is necessary to bring the camera from the site to the place where the content owner is. To avoid this, a demand has arisen for a mechanism that registers a memory card for a camera in a remote site as a medium capable of right protection, thereby protecting image data stored in the memory card upon shooting.

SUMMARY OF THE INVENTION

In one aspect, the present invention relates to a data processing apparatus comprising: an input section, arranged to input information for encryption key generation; a key generator, arranged to generate an encryption key from the information for encryption key generation; an authenticator, arranged to acquire encryption key verification data from a storage medium and authenticate, based on the verification data, validity of the encryption key generated by the key generator; a data generator, arranged to generate data to be stored in the storage medium; an encryption section, arranged to encrypt the data generated by the data generator by using the encryption key whose validity is authenticated by the authenticator; and a controller, arranged to store the data encrypted by the encryption section in the storage medium.

In another aspect, the present invention relates to an information processing apparatus comprising: a key generator, arranged to generate an encryption key to be used when an external device stores data in a storage medium; a verification data generator, arranged to generate verification data to authenticate validity of the encryption key and store the verification data in the storage medium; and a decryption section, arranged to decrypt the data stored in the storage medium by using the encryption key.

In another aspect, the present invention relates to a method of processing data, the method comprising the steps of: inputting information for encryption key generation; generating an encryption key from the information for encryption key generation; acquiring encryption key verification data from a storage medium and authenticating, based on the verification data, validity of the generated encryption key; generating data to be stored in the storage medium; encrypting the generated data by using the encryption key whose validity is authenticated in the authenticating step; and storing the encrypted data in the storage medium.

In another aspect, the present invention relates to a method of processing information, the method comprising the steps of: generating an encryption key to be used when an external device stores data in a storage medium; generating verification data to authenticate validity of the encryption key and storing the verification data in the storage medium; and decrypting the data stored in the storage medium by using the encryption key.

According to these aspects, it is possible to protect the right of a content owner without any necessity of a special storage medium incorporating a copyright protecting mechanism even when the content owner does not coincide with a content creator.

Further features of the present invention will become apparent from the following description of exemplary embodiments with reference to the attached drawings.

DESCRIPTION OF THE EMBODIMENTS

An information processing apparatus, data processing apparatus, and methods thereof according to the embodiments of the present invention will now be described in detail with reference to the accompanying drawings. An example will be described below in which a content owner requests photographing of a digital camera user. In this case, the photographer, that is, the digital camera user corresponds to a content creator. In the present invention, however, the content creator is not limited to the digital camera user (photographer). Anyone who creates contents complying with a request from a content holder corresponds to the content creator of the present invention independently of the type of created contents.

First Embodiment

Figure 1:
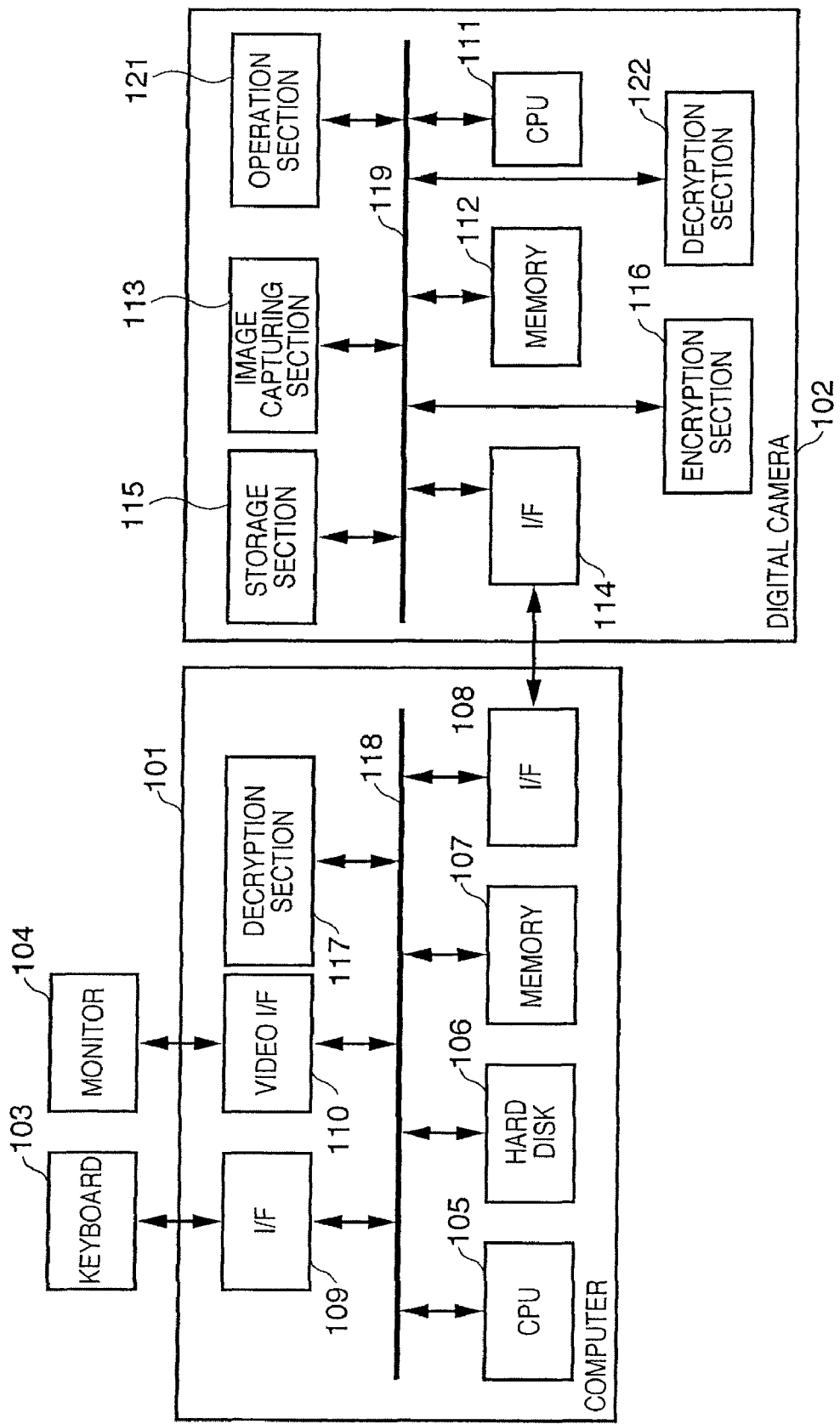
FIG. 1 is a block diagram showing an information processing system according to an embodiment.

FIG. 1 is a block diagram showing an information processing system according to the embodiment, which includes a computer 101 and a digital camera 102.

[Arrangement of Computer]

A CPU 105 formed from a microprocessor executes programs stored in a hard disk 106 and a ROM (Read Only Memory) included in a memory 107 by using, as a work memory, a RAM (Random Access Memory) included in the memory 107. The CPU 105 controls an arrangement to be described later via a system bus 118 and executes various kinds of processes.

The hard disk 106 stores driver software to control the digital camera 102, image data such as text, graphic, and photo data, and various kinds of software programs to generate, edit, and modify image data.

The CPU 105 executes various kinds of software programs and displays a user interface on a monitor 104 via a video I/F 110. The CPU 105 receives a user instruction via a keyboard 103 or mouse connected to an interface (I/F) 109 such as a USB (Universal Serial Bus).

An I/F 108 is a serial bus interface such as a USB or IEEE1394 or a network interface. An image input/output device such as the digital camera 102 or a printer, a memory card reader/writer, or a network cable is connectable to the I/F 108.

The CPU 105 receives image data directly from the digital camera 102 via the I/F 108, via a network, or from a storage medium attached to the memory card reader/writer and stores the data in a predetermined area of the hard disk 106. If image data is encrypted or has a digital signature, the CPU 105 executes decryption or authentication by controlling a decryption section 117.

[Arrangement of Digital Camera]

A CPU 111 executes programs stored in a RON included in a memory 112 by using, as a work memory, a RAM included in the memory 112. The CPU 105 controls an arrangement to be described later via a system bus 119 and executes various kinds of processes.

An image capturing section 113 having a sensor such as a CCD captures an object and generates image data corresponding to a still image or moving image of the object. The CPU 111 stores image data captured by the image capturing section 113 in the ROM of the memory 112, executes necessary data processing, encryption, and digital signature addition, and then stores the data in a storage section 115. An encryption section 116 is used to encrypt data or add a digital signature to data.

An operation section 121 includes a shutter button and command dials and keys to set various photographing conditions and is capable of inputting various kinds of setting information necessary for an encryption process and a digital signature process. That is, the user uses the operation section 121 to, for example, input a password to generate key information necessary for an encryption process.

An I/F 114 is a serial bus interface such as a USB or IEEE1394 or a network interface. Various devices such as the computer 101 or a printer, a memory card reader/writer, or a network cable are/is connectable to the I/F 114.

[Input of Image Data]

To receive image data from the storage section 115 of the digital camera 102, the CPU 105 executes an instruction described in driver software or application software. The image data request is sent to the CPU 111 via the I/Fs 108 and 114. In response to the request, the CPU 111 reads out image data from the storage section 115 and supplies it to the computer 101 via the I/Fs 114 and 108. The CPU 105 stores the received image data in a predetermined area of the hard disk 106.

Figure 2:
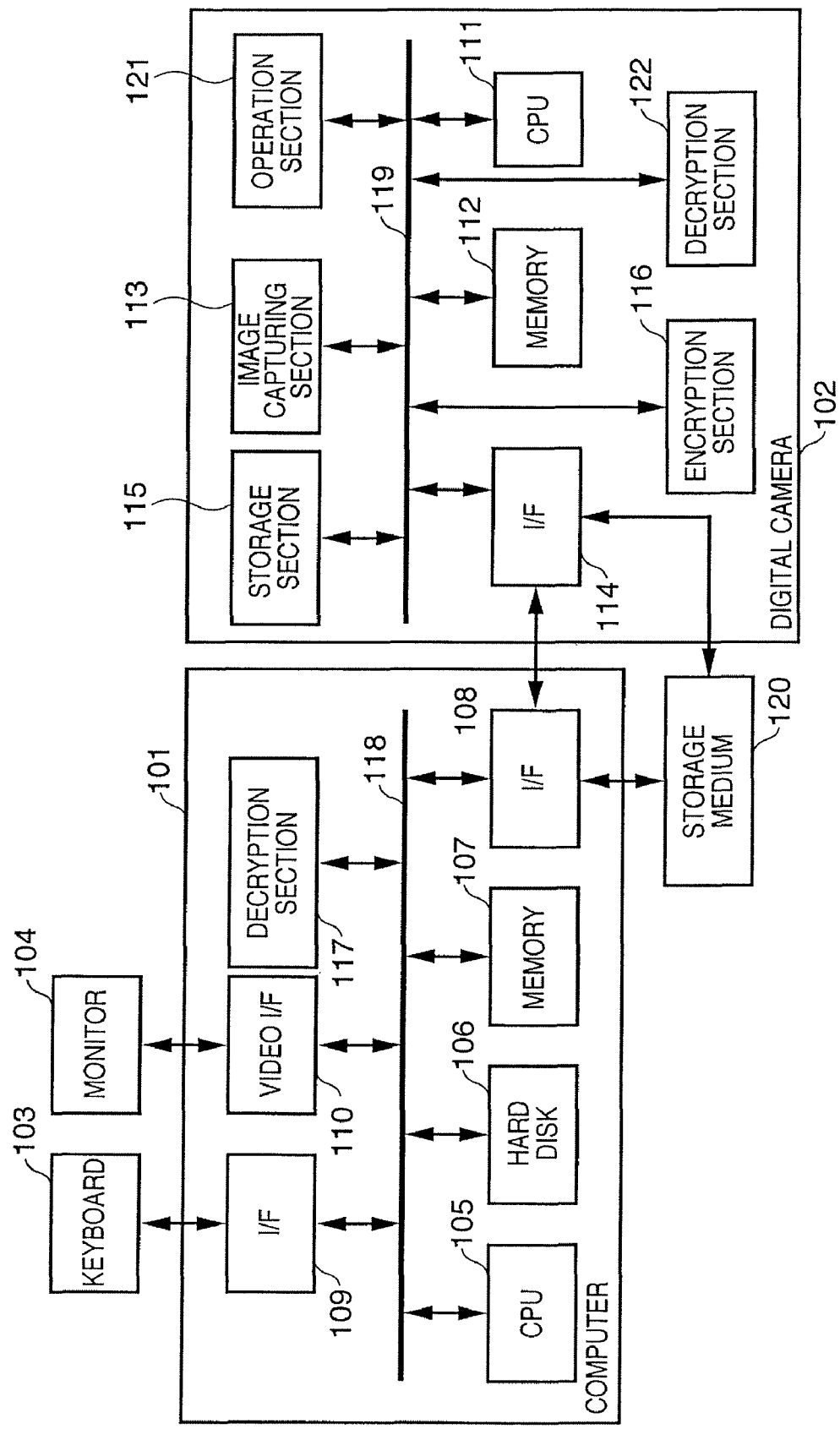
FIG. 2 is a block diagram showing an example wherein the information processing system shown in FIG. 1 uses a portable storage medium.

Alternatively, the digital camera 102 can supply image data to the computer 101 by using a portable storage medium 120, as shown in FIG. 2. In this case, the CPU 111 writes image data read out from the storage section 115 in the storage medium 120 attached to a memory card reader/writer connected to the I/F 114 in accordance with an instruction from the operation section 121. The CPU 105 reads out the image data from the storage medium 120 attached to the memory card reader/writer connected to the I/F 108 in accordance with a user instruction received via a user interface.

[Decryption Section]

Figure 3:
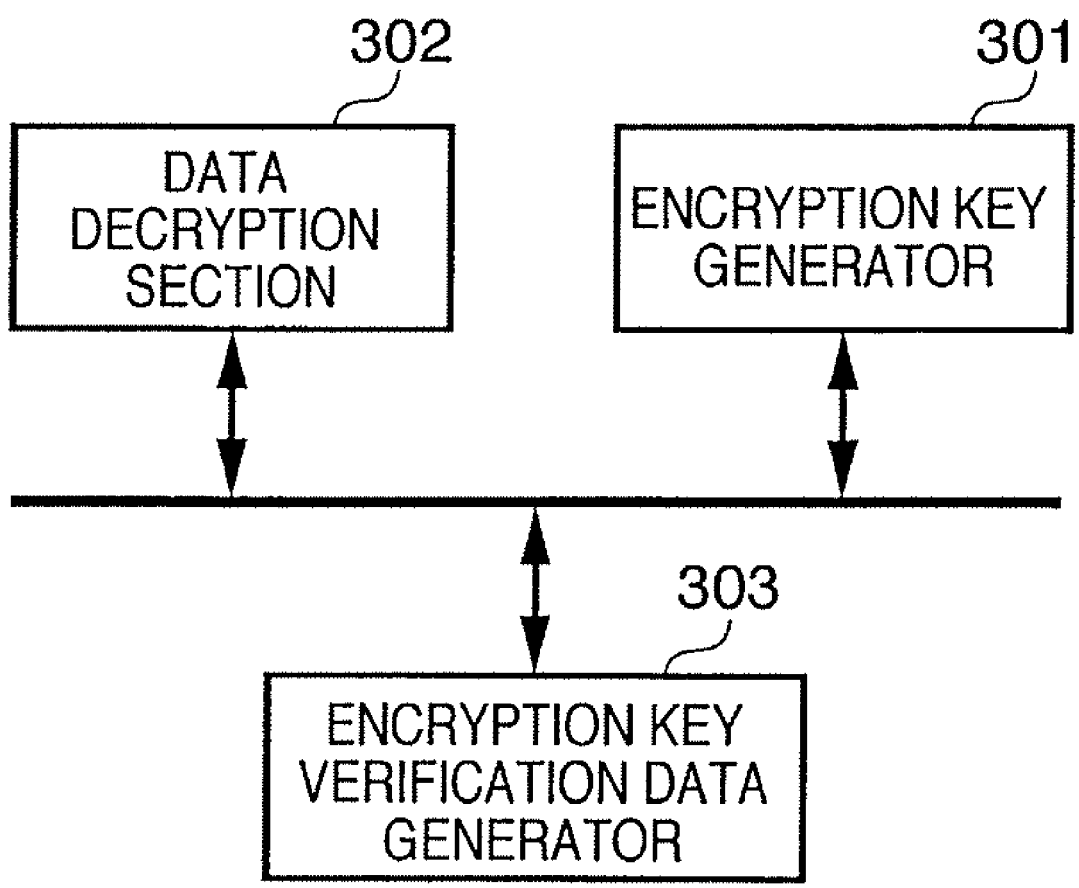
FIG. 3 is a block diagram showing an arrangement of a decryption section.

FIG. 3 is a block diagram showing an arrangement of the decryption section 117 or 122.

An encryption key generator 301 generates an encryption key to be used to store image data in the storage medium 120 or hard disk 106. The memory 107 or 112 stores the encryption key generated by the encryption key generator 301.

A data decryption section 302 uses the encryption key stored in the memory 107 or 112 to decrypt encrypted image data stored in the storage medium 120 or hard disk 106. The decrypted image data is stored in a predetermined area of the hard disk 106.

An encryption key verification data generator 303 generates encryption key verification data to verify whether the encryption key corresponding to the encrypted image data stored in the storage medium 120 or hard disk 106 is valid. The storage medium 120 or hard disk 106 stores the encryption key verification data generated by the encryption key verification data generator 303. A process using encryption key verification data will be described later.

[Encryption Section]

Figure 4:
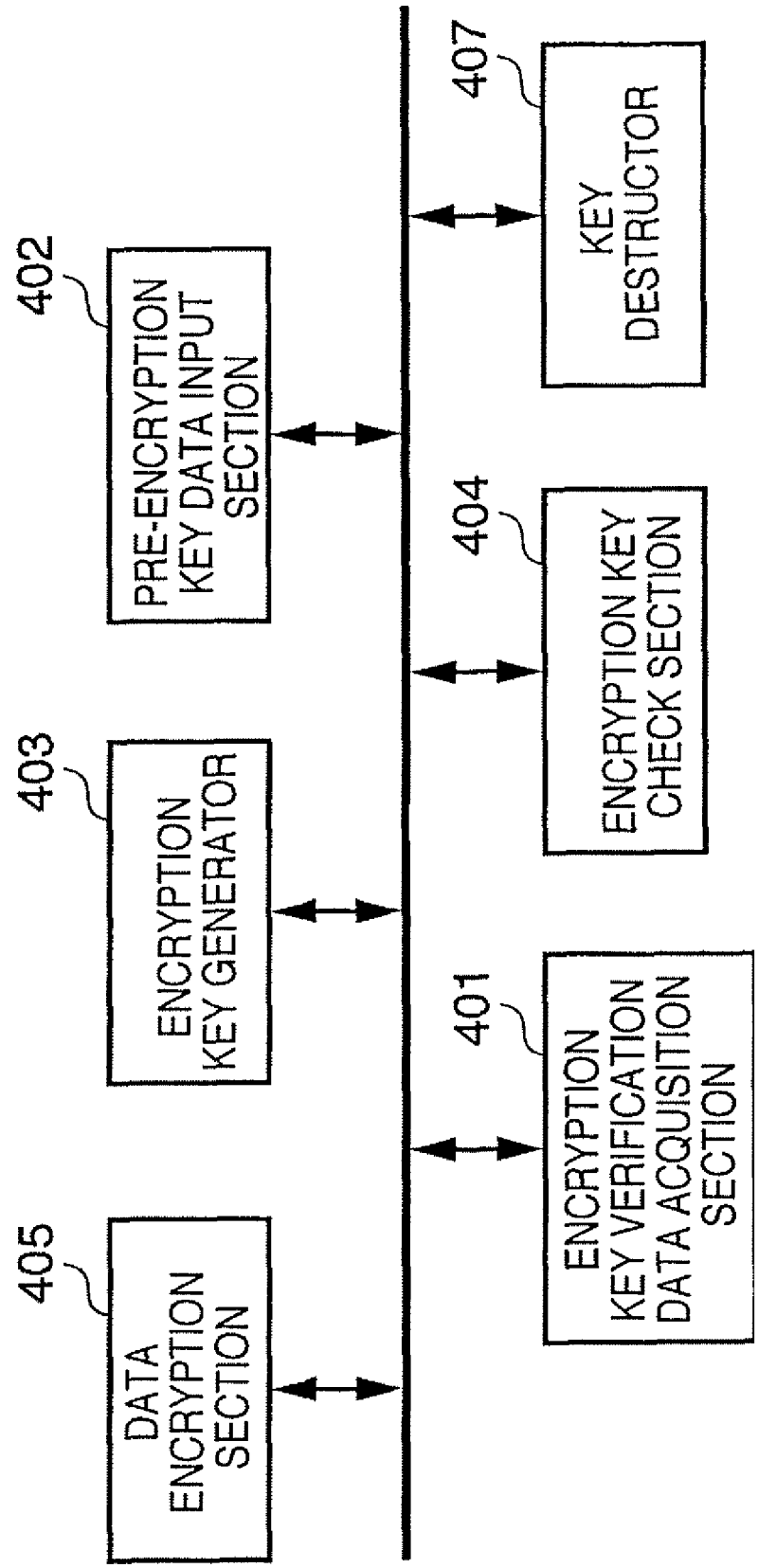
FIG. 4 is a block diagram showing an arrangement of an encryption section.

FIG. 4 is a block diagram showing an arrangement of the encryption section 116.

An encryption key verification data acquisition section 401 acquires encryption key verification data from the storage medium 120 via the I/Fs 108 and 114.

A pre-encryption key data input section 402 inputs pre-encryption key data that is information to generate an encryption key. Pre-encryption key data corresponds to, for example, a password and is input from the keyboard 103 of the computer 101 or the operation section 121 of the digital camera 102.

An encryption key generator 403 generates an encryption key from the pre-encryption key data. The algorithm for generating an encryption key from pre-encryption key data, or key data used by the algorithm is secret. Encryption key generation is done on a memory having a tamper resistance. That is, even when a third party knows pre-encryption key data, he/she can neither derive an encryption key by using a device of his/her own nor decrypt encrypted image data.

An encryption key check section 404 confirms based on the encryption key verification data whether the encryption key generated by the encryption key generator 403 is correct. A process using encryption key verification data will be described later.

A data encryption section 405 encrypts image data stored in the memory 112 by using the encryption key and stores the encrypted data in the storage section 115 or storage medium 120.

A key destructor 407 generates, for example, a session key to be used to encrypt image data.

[Encryption and Decryption of Image Data]

A series of processes of encrypting image data generated by the digital camera 102, storing the image data in the storage medium 120, loading the encrypted image data from the storage medium 120 to the computer 101, and decrypting the image data to make it processible will be described below in five phases.

Figure 5:
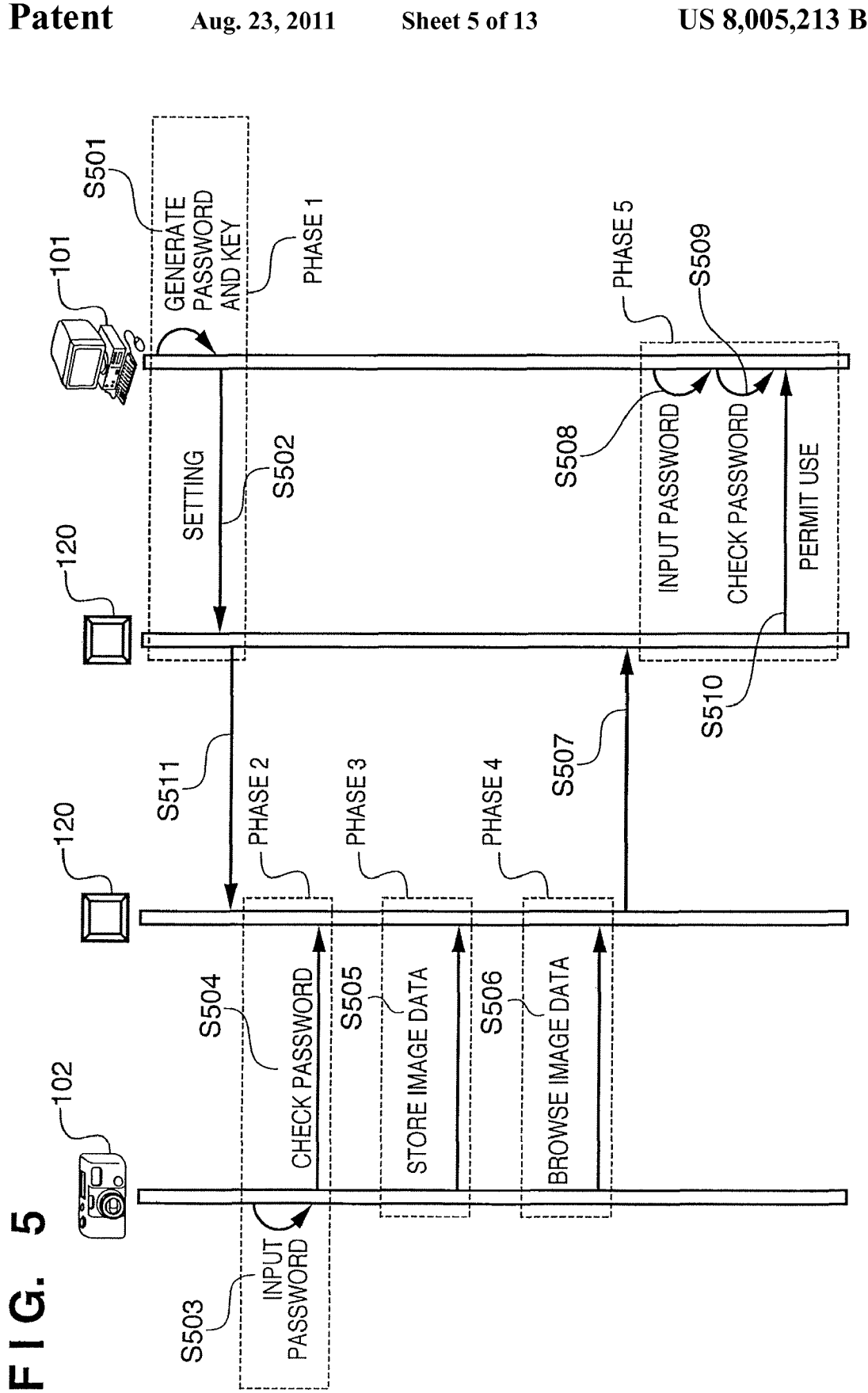
FIG. 5 is a sequence chart for schematically explaining five phases.

FIG. 5 is a sequence chart for schematically explaining the five phases. The content holder (to be sometimes referred to as a "holder" hereinafter) holds the computer 101. The photographer holds the digital camera 102.

Phase 1: The holder inputs a password (pre-encryption key data) by operating the keyboard 103 of the computer 101, generates an encryption key and encryption key verification data (S501), and sets the encryption key verification data in the storage medium 120 (S502). The holder gives the storage medium 120 to the photographer, requests photographing, and secretly makes the photographer know the password (S511). In this situation, the content holder does not coincide with the photographer.

Phase 2: The photographer attaches the received storage medium 120 to the digital camera 102 and inputs the password received from the holder by operating the operation section 121 of the digital camera 102 (S503). The digital camera 102 checks the validity of the input password by using the encryption key verification data set in the storage medium 120 (S504). This will be described later in detail.

Phase 3: Upon finishing password check, the digital camera 102 encrypts sensed image data by using an encryption key derived from the password and stores the image data in the digital camera 102 (S505). As described above, only the holder knows how to derive the encryption key. The method is kept secret from third parties including the photographer. Key derivation will be described later in detail.

Phase 4: The photographer can browse the taken image data (S506). The photographer gives the storage medium 120 storing the encrypted image data to the holder or outputs the encrypted image data via the I/F 114 and transmits them to the holder via a wide area network such as the Internet (S507). To transmit the encrypted image data output from the I/F 114 to the holder, not only transmission through a wide area network but also many other methods are usable.

Phase 5: The holder inputs the password by operating the keyboard 103 of the computer 101 (S508). The computer 101 checks the validity of the input password by using encryption key verification data stored in, for example, the hard disk 106 (S509). Upon finishing password check, the computer 101 generates an encryption key from the password and decrypts the image data received or stored in the storage medium 120 by using the encryption key, thereby making it possible to use (e.g., browse, copy or edit) the image data (S510).

Phase 1

Figure 6:
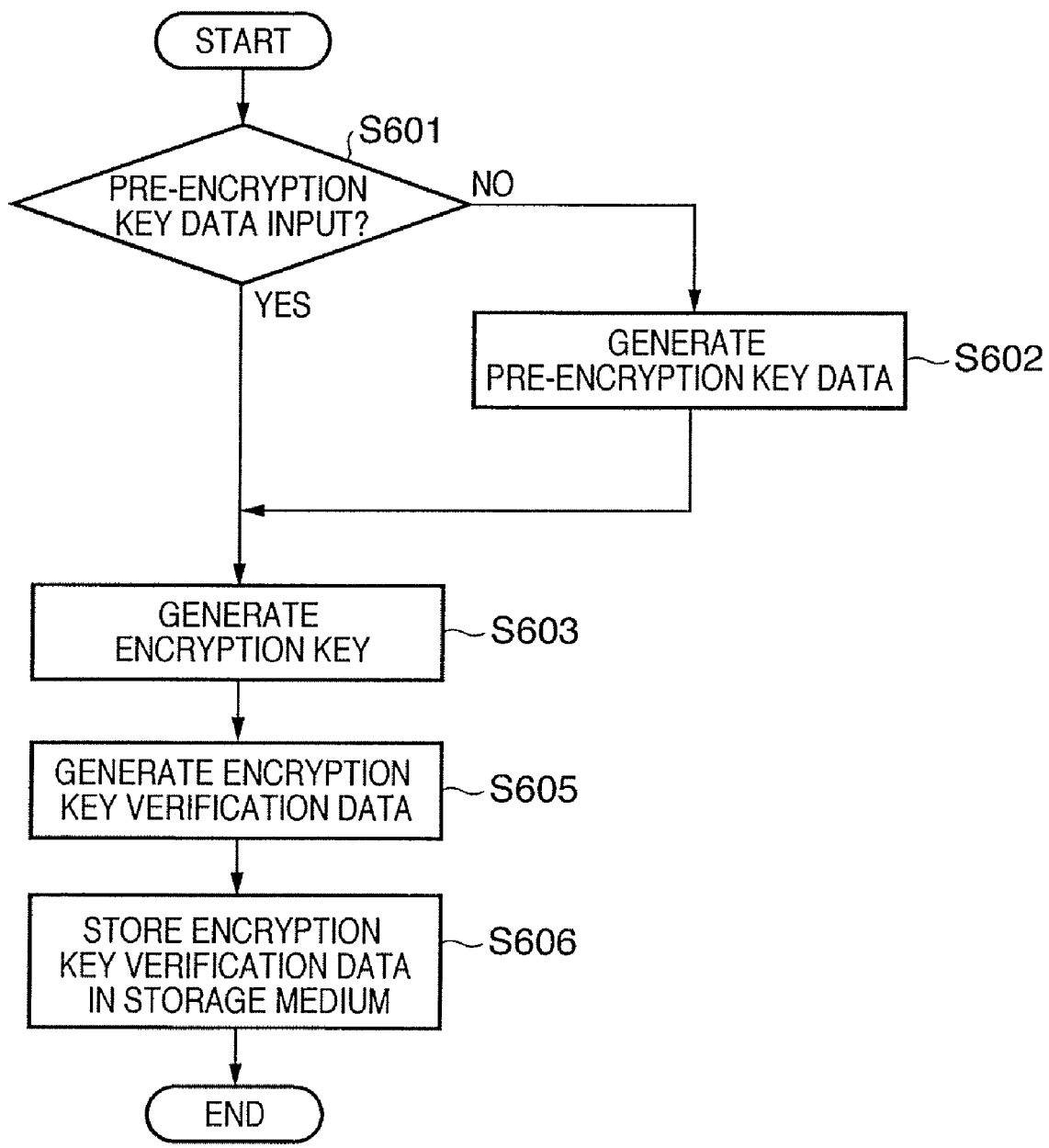
FIG. 6 is a flowchart illustrating a presetting procedure in a computer.

In phase 1, using the computer 101, the holder executes presetting in the storage medium 120 to be used by the photographer in photographing (S501 and S502). FIG. 6 is a flowchart illustrating a presetting procedure. This process is executed under the control of the CPU 105.

The CPU 105 determines whether a password (pre-encryption key data) is input via the keyboard 103 (S601). The pre-encryption key data can be of any type if it can be input via the operation section of the digital camera 102. If no password (pre-encryption key data) is input within a predetermined time, or an instruction to generate pre-encryption key data is input, the CPU 105 generates pre-encryption key data and displays it on the monitor 104 (S602)

The CPU 105 generates an encryption key based on the pre-encryption key data by controlling the encryption key generator 301 of the decryption section 117 (S603) The CPU 105 can derive an encryption key by using, for example, the above-described hash function or MAC. For example, when the computer 101 and digital camera 102 hold identical system keys Ksys in the hard disk 106 and storage section 115, respectively, an output of an HMAC process that is executed by using Ksys as a key and inputting pre-encryption key data is set as an encryption key Kenc. If the system key Ksys is not present, an output of an SHA-1 hash process that is executed by inputting the pre-encryption key data is set as the encryption key Kenc. Alternatively, a one-way function using a public key cryptosystem may be used in place of the SHA-1 hash function.

Next, the CPU 105 generates encryption key verification data by controlling the encryption key verification data generator 303 and temporarily saves the generated encryption key verification data in, for example, the memory 107 (S605). The encryption key verification data derives from the encryption key or pre-encryption key data. The generation method is based on the above-described encryption key derivation method. For example, when the computer 101 and digital camera 102 hold the identical system keys Ksys in the hard disk 106 and storage section 115, respectively, an output of an HMAC process that is executed by using Ksys as a key and inputting the encryption key Kenc is set as encryption key verification data. If the system key Ksys is not present, encryption key verification data can be generated by adding a digital signature using a public key cryptosystem. More specifically, an RSA signature using an RSA private key held by only the holder is added, and the signed data is set as encryption key verification data.

The CPU 105 stores, in the storage medium 120, the encryption key verification data stored in the memory 107 by controlling the I/F 108 (S606). Instead of temporarily saving the encryption key verification data in the memory 107, it may directly be stored in the storage medium 120. In this case, step S606 is omitted.

Figure 7:
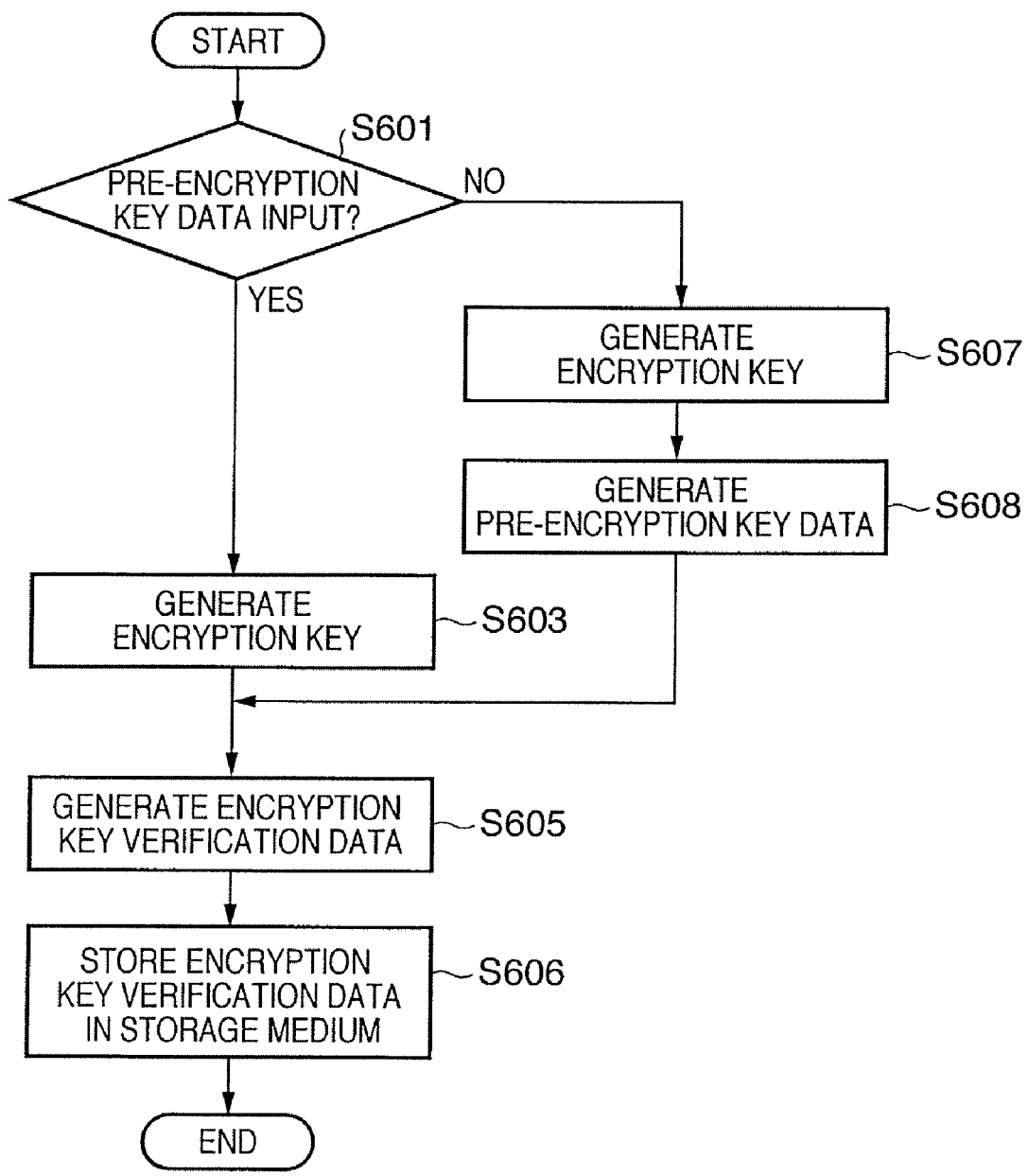
FIG. 7 is a flowchart illustrating another presetting procedure in a computer.

FIG. 7 is a flowchart illustrating another presetting procedure. The same step numbers as in FIG. 6 denote the same processes in FIG. 7, and a detailed description thereof will not be repeated.

If no password (pre-encryption key data) is input, or an encryption key generation instruction is input, the CPU 105 generates an encryption key by controlling the encryption key generator 301 (S607). The CPU 105 generates pre-encryption key data corresponding to the generated encryption key and displays it on the monitor 104 (S608). The process advances to step S605. Pre-encryption key data is generated by using, for example, a trapdoor one-way function based on a public key cryptosystem. For example, an RSA encryption process by a private key is used to convert an encryption key to pre-encryption key data. According to this method, the digital camera 102 can derive an encryption key from the pre-encryption key data by using an RSA public key.

The process shown in FIG. 6 is largely different from that shown in FIG. 7 in that which one of the encryption key and pre-encryption key data (password) exists first. The process shown in FIG. 6 in which pre-encryption key data exists first can derive an encryption key by using a common key cryptosystem or a hash function without using a public key cryptosystem. On the other hands the process shown in FIG. 7 in which an encryption key exists first must ensure a mechanism that allows only the holder of a private key to derive an encryption key from pre-encryption key data by using a trapdoor one-way function based on a public key cryptosystem, like RSA encryption.

The public key and private key may be used conversely. That is, an RSA encryption process by the public key of the digital camera 102 is used to convert an encryption key to pre-encryption key data. In this case, the digital camera 102 derives an encryption key from the pre-encryption key data by using an RSA private key. Note that the digital camera has the own private key different from the private key held by the other digital camera. This method allows specifying the digital camera capable of using the storage medium 120. However, it is necessary to store the private key of the digital camera 102 in a memory having a tamper resistance in advance.

Phase 2

Figure 8:
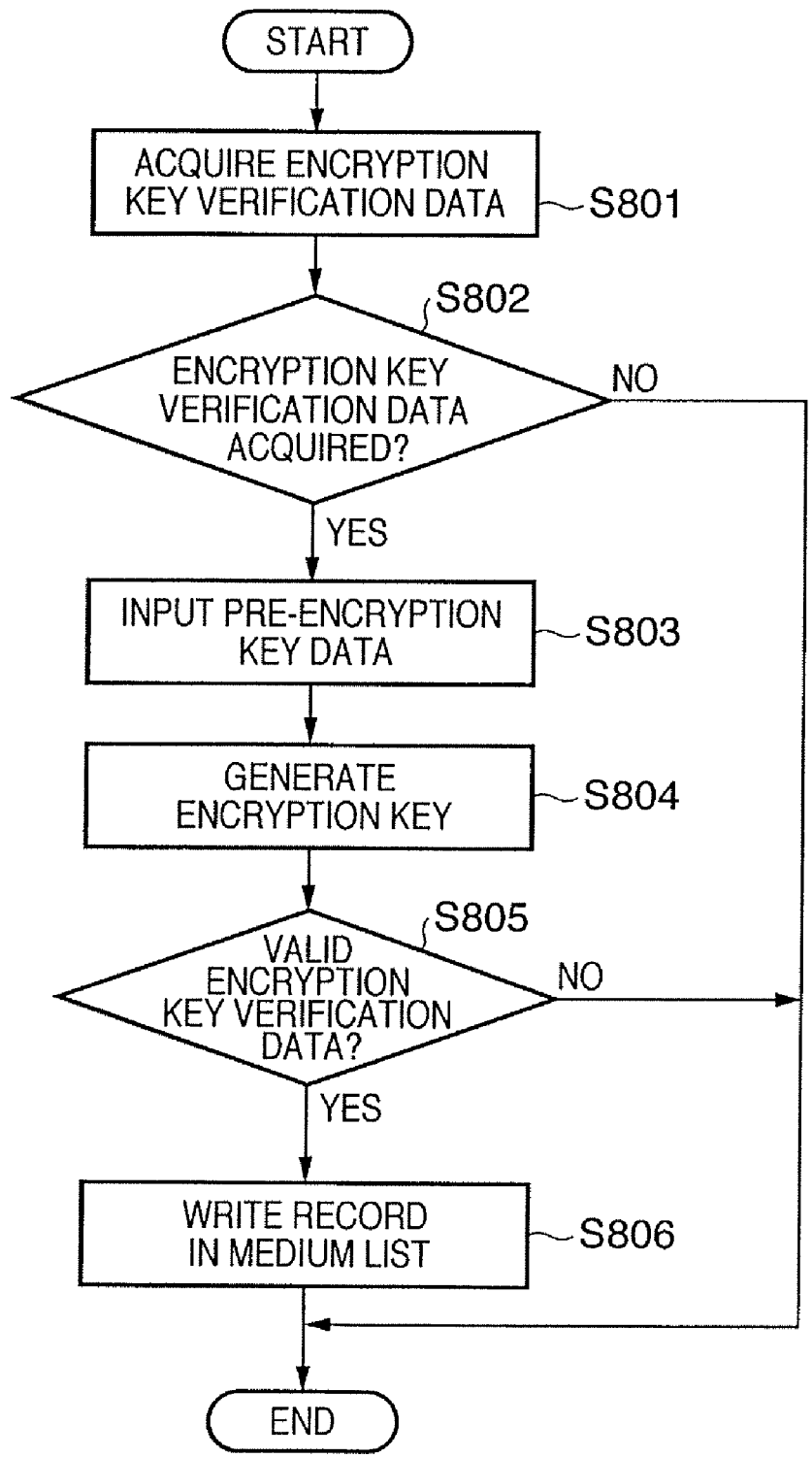
FIG. 8 is a flowchart illustrating a preprocess procedure in a digital camera.

In phase 2, the digital camera 102 executes a preprocess (S503 and S504) of checking whether it has a data write right for the storage medium 120 connected to the I/F 114. FIG. 8 is a flowchart illustrating a preprocess procedure. This process is executed by the CPU 111.

The CPU 111 acquires encryption key verification data from the storage medium 120 by controlling the encryption key verification data acquisition section 401 (S801). If no encryption key verification data is acquired (S802), the CPU 111 determines that the digital camera has no data write right for the storage medium 120, and the process is ended.

The CPU 111 inputs pre-encryption key data (password) by controlling the pre-encryption key data input section 402 (S803). The password (pre-encryption key data) which the photographer should input by operating the operation section 121 is the password given by the holder. The password to be input depends on the user interface of the digital camera 102. The password may be a human-readable password, a password handwritten on a touch panel, or a combination of operations of switches and shutter button. The operation section 121 may input a password by displaying a virtual keyboard on the monitor and causing the user to select characters and numbers on the touch panel, or by setting a password input mode and causing the user to press a combination of a plurality of buttons. Hence, the CPU 105 of the computer 101 sometimes converts an acquired or generated password into an operation procedure in which the photographer can input via the user interface of the digital camera 102.

The CPU 111 generates an encryption key based on the pre-encryption key data by controlling the encryption key generator 403 and stores the generated encryption key in the memory 112 (S804). The encryption key generator 403 provides a mechanism for deriving a single encryption key from passwords such as a human-readable password, a password handwritten on the touch panel, and a combination of operations of switches and shutter button. The encryption key generation method conforms to the method described in step S603 of phase 1. That is, the same generation method as that of the computer 101 is used.

It is possible to describe an encryption key generation method as part of acquired encryption key verification data. For example, an encryption key generation method is registered as a storage area of a server corresponding to a specific URI (Uniform Resource Identifier) in advance. By referring to the registered information based on the URI described as part of encryption key verification data, a predetermined encryption key generation method can be selected from a plurality of encryption key generation methods.

Next, the CPU 111 authenticates the validity of encryption key verification data by controlling the encryption key check section 404 (S805). The verification method conforms to the method described in step S605 of phase 1. If the validity is not authentic, the process is ended. That is, the encryption key verification data is usable to detect whether the pre-encryption key data has been input without any error.

When the validity if the encryption key verification data is authentic, the CPU 111 registers the record of the storage medium 120 in a medium list (not shown) stored in the storage section 115 (S806). The record includes a combination of the ID of the storage medium 120, the encryption key verification data or its hash value (digest), and pre-encryption key data or data derived from the encryption key. Counter information or a salt may be stored in the same record as metadata about key information to be used for image encryption in phase 3. This will be described later in detail in association with phase 3.

The process in step S806 is not essential but effective in imparting a pre-encryption key data (password) cache function. That is, once the preprocess is done between the digital camera 102 and the storage medium 120, the CPU need only refer to the medium list even when the storage medium 120 is exchanged frequently, saving time and efforts for acquiring pre-encryption key data (password).

Phase 3

In phase 3, the digital camera 102 causes the data encryption section 405 to encrypt sensed image data by using the encryption key generated in phase 2 and stores the data in the storage medium 120 (S505). The encryption key may directly be used for encryption using a common key cryptosystem. Alternatively, a session key may be derived for each image data and used as an encryption key. To derive a session key, a hash function or HMAC is used. More specifically, the method is the same as the above-described method using an HMAC process or SHA-1 hash process.

Two detailed examples as the derivation method will be described. (1) When the system key Ksys is held, a first session key Kenc(0) is the encryption key Kenc, and an output of an HMAC process that is executed by using Ksys as a key and inputting a session key Kenc(i−1) is set as a session key Kenc(i). (2) If the system key Ksys is not present, the first session key Kenc(0) is the encryption key Kenc, and an output of an SHA-1 hash process that is executed by inputting the session key Kenc(i−1) is set as the session key Kenc(i).

In both cases, it is necessary to store counter information i in, for example, the storage section 115. The counter information i can be managed by storing it in the record of medium list described in step S806. The input to the HMAC process or SHA-1 hash process can also include salt information containing random data. Even in this case, it is necessary to store and manage the salt information in the above-described record of medium list. In either case, the counter information (and salt information) is necessary for decryption. Hence, encrypted image data must have the counter information (and salt information) as metadata. When encryption key verification data such as MAC is generated for the counter information (and salt information) and sent together with the encrypted image data, the holder can be prevented from decrypting the data by using a wrong key.

An encryption key for encryption using a public key cryptosystem is the public key of the holder, and therefore, encryption is done by directly using the encryption key. In this case, the session key Kenc(i) changes every time an image is encrypted. Inverse calculation from Kenc(i) to Kenc(i−1) is difficult. Hence, a session key once used is regarded to be actually destructed every time. This allows dealing with read attack to the CPU 111 or memory 112 and raises the security level of the system.

Figure 11:
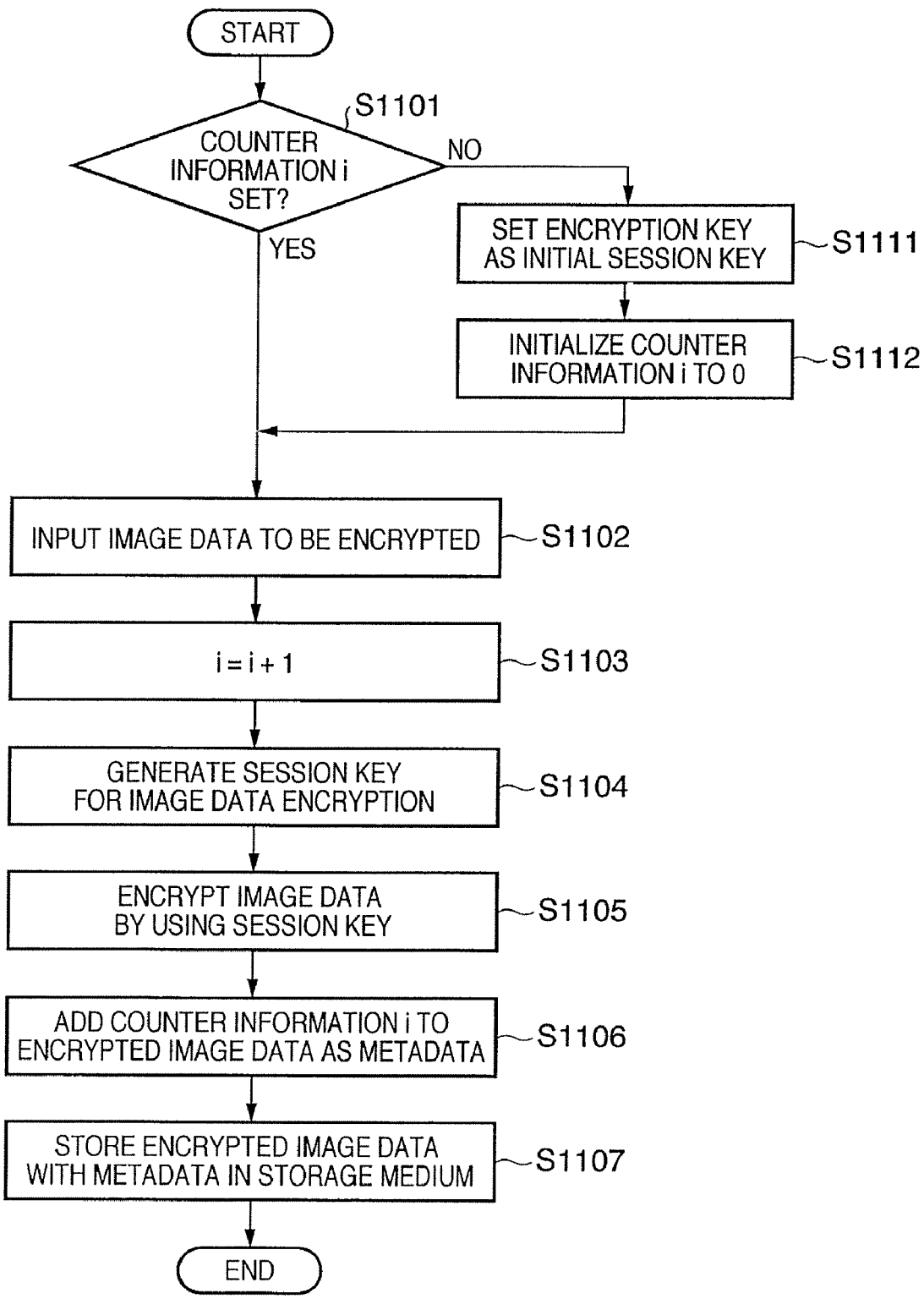
FIG. 11 is a flowchart for explaining an encryption process of generating a session key for each image data.

FIG. 11 is a flowchart for explaining an encryption process of generating a session key for each image data. This process is executed by the encryption section 116.

The encryption key generator 403 of the encryption section 116 determines whether the counter information i is set in the memory 112 or the medium list stored in the storage section 115 or storage medium 120 (S1101). This determination is done to check whether a session key has been generated before. If the counter information i is set, the process advances to step S1102. Otherwise, the process advances to step S1111.

If no counter information i is set, the encryption key generator 403 stores, in the memory 112, the encryption key Kenc as the initial session key Kenc(0) (S1111). The encryption key generator 403 sets the counter information i stored in the memory 112 or storage medium 120 to 0 (S1112) The process advances to step S1102.

The data encryption section 405 receives image data to be encrypted from, for example, the storage section 115 (S1102). The encryption key generator 403 increments the counter information i (i=i+1) (S1103).

The key destructor 407 generates a session key to be used for image data encryption (S1104). For example, an output of an HMAC process that is executed by using the system key Ksys (system key Ksys stored in, e.g., the memory 112) as a key and inputting the session key Kenc(i−1) is set as the session key Kenc(i) and overwritten on the session key Kenc (i−1). In the operation in step S1104, the session key Kenc(i−1) is converted to the session key Kenc(i) by using a one-way function. Inverse calculation from Kenc(i) to Kenc(i−1) is difficult. Hence, the session key Kenc(i−1) is regarded to be actually destructed. This session key generation method will be called an "every time key destruction scheme".

Next, the data encryption section 405 encrypts image data by using the session key Kenc(i) (S1105) and adds the counter information i to the encrypted image data as metadata (S1106). The storage section 115 or storage medium 120 stores the encrypted image data with the metadata (S1107). In step S1106, not only the counter information but also salt information is sometimes added to the encrypted image data as metadata.

In some cases, secondary image data (e.g., thumbnail image) of sensed image data (original image data) is added to the image data. The thumbnail image is normally non-encrypted, though it may be encrypted. If the non-encrypted thumbnail image is held as metadata, a list of sensed images can be displayed from phase 4.

To encrypt the thumbnail image, either a session key identical to that used for the original image data or another session key is usable. The former cannot cope with the every time key destruction scheme. The latter is derived as a session key for a thumbnail, which is different from that used for encryption of the original image data, by the same method. If a mechanism for deriving a session key used before for a thumbnail is provided to the record of medium list described in step S806, the encrypted thumbnail image can be displayed in phase 4.

Phase 4

In phase 4, the digital camera 102 displays encrypted image data stored in the storage medium 120 for browsing in accordance with an instruction of the photographer (S506). Not decrypted encrypted image data but thumbnail images are browsible. Inhibiting encryption of thumbnail images in phase 3 enables browsing of the images stored in the storage medium 120.

Even thumbnail images encrypted in phase 3 can be made browsible by decrypting them, as a matter of course. In this case, a mechanism for making images browsible only in the digital camera 102 that stores the encrypted image data in the storage medium 120 is provided. More specifically, the thumbnail images are encrypted by using "secret information known by only the digital camera 102". The "secret information known by only the digital camera 102" is stored in the record of medium list described in step S806. A first session key Kthum(0) for thumbnail is derived from the encryption key Kenc by an HMAC process or SHA-1 process and stored in the record of medium list as the "secret information known by only the digital camera 102". For decryption, a session key Kthum(i) for the i-th thumbnail image is derived by, for example, executing an SHA-1 process for Kthum(0) i times. The session key Kthum(i) for thumbnail may be derived by calculating SHA-1(Kthum(0)||i) or SHA-1(Kthum(0)||SHA-1(i)). Note that "||" indicates concatenation of data. In either case, safe key management is possible because the encryption key Kenc can not be derived from the first session key Kthum(0) for thumbnail.

Figure 12:
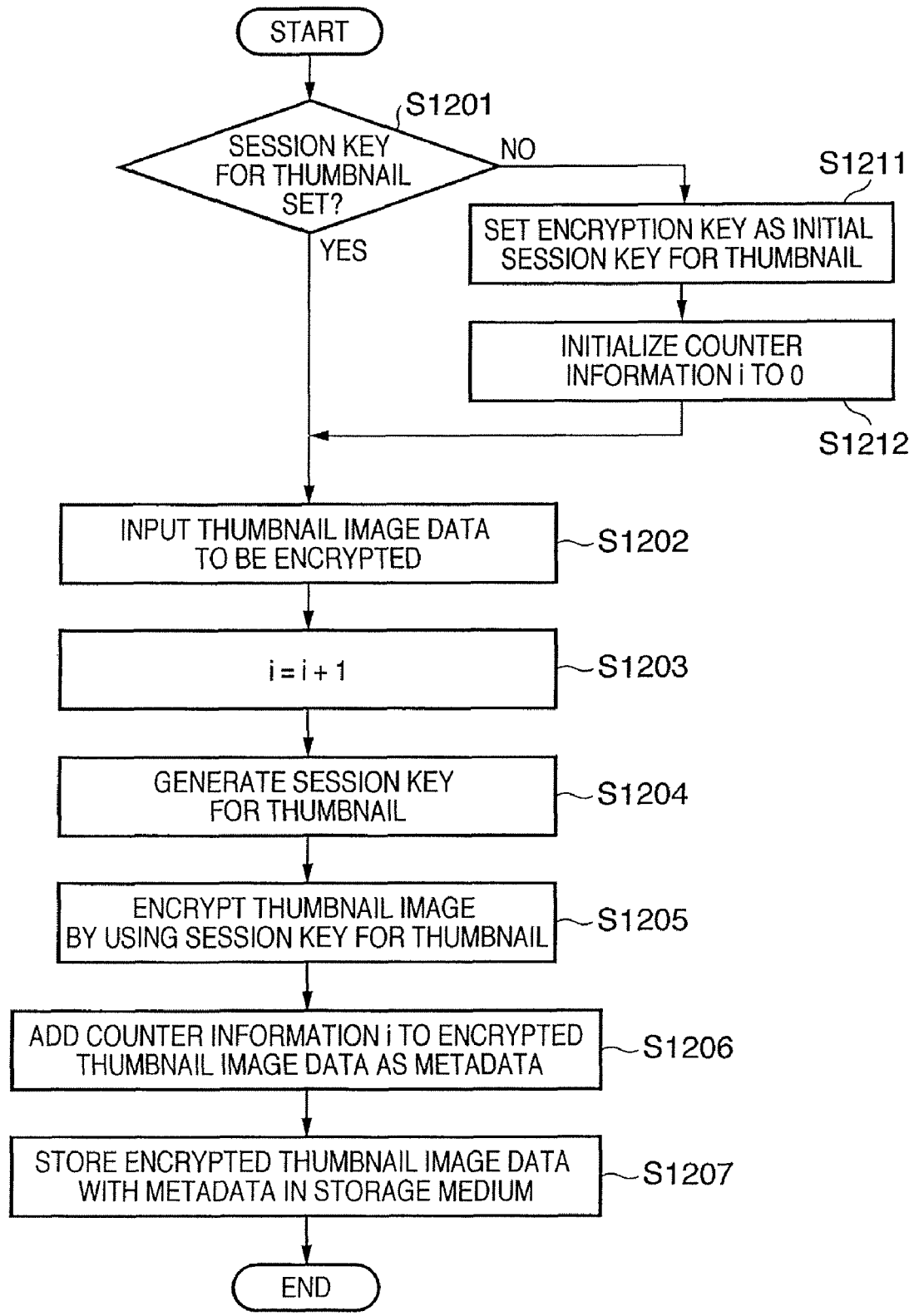
FIG. 12 is a flowchart for explaining a process of encrypting a thumbnail image by generating a session key for each image data.

FIG. 12 is a flowchart for explaining a process of encrypting a thumbnail image by generating a session key for each image data. This process is executed by the encryption section 116.

The encryption key generator 403 determines whether a session key for thumbnail is set in, for example, the memory 112 (S1201). If a session key for thumbnail is set, the process advances to step S1202. Otherwise, the process advances to step S1211.

If no session key for thumbnail is set, the encryption key generator 403 stores, in the record of medium list, the encryption key Kenc as the initial session key Kthum(0) for thumbnail (S1211). The encryption key generator 403 sets the counter information i stored in the memory 112 or storage medium 120 to 0 (S1212). The process advances to step S1202. The counter information i may be common to that used for encryption of original image data (S1103 to S1106).

The data encryption section 405 receives thumbnail image data to be encrypted from, for example, the storage section 115 (S1202). The encryption key generator 403 increments the counter information i (S1203).

The encryption key generator 403 generates a session key for thumbnail to be used for thumbnail image data encryption (S1204). For example, the session key Kthum(i) for thumbnail is derived by, for example, executing an SHA-1 process for the initial session key Kthum(0) for thumbnail i times. The session key Kthum(i) for thumbnail may be derived by calculating SHA-1(Kthum(0)||i) or SHA-1(Kthum(0)||SHA-1(i)).

Next, the data encryption section 405 encrypts the thumbnail image by using the session key Kthum(i) for thumbnail (S1205) and adds the counter information i to the encrypted thumbnail image as metadata (S1206). The storage section 115 or storage medium 120 stores the encrypted thumbnail image with the metadata (S1207).

Figure 13:
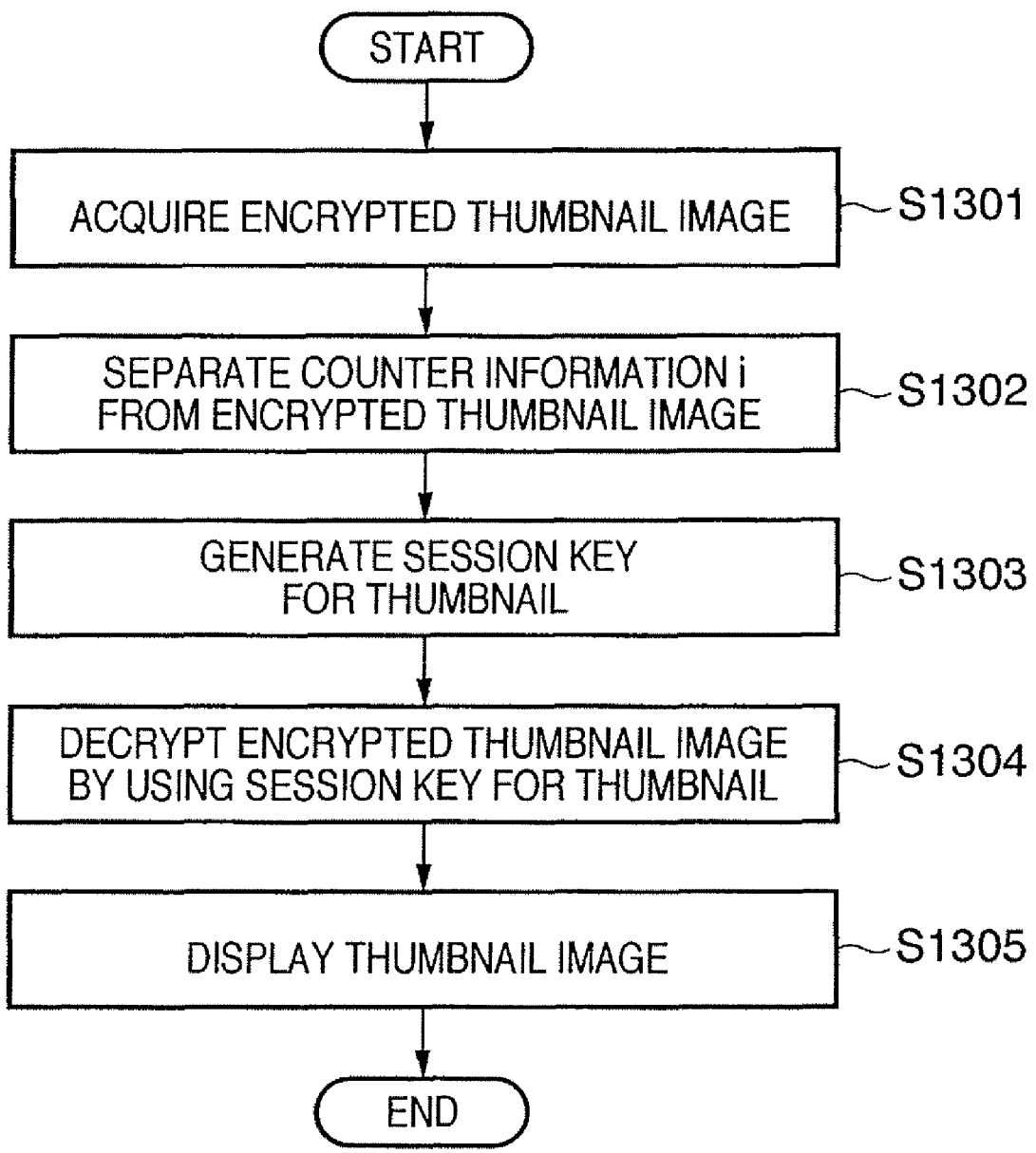
FIG. 13 is a flowchart for explaining a decryption method in browsing an encrypted thumbnail image in the digital camera.

FIG. 13 is a flowchart for explaining a decryption method in browsing an encrypted thumbnail image in the digital camera. This process is executed by the decryption section 122.

The data decryption section 302 of the decryption section 122 acquires an encrypted thumbnail image with metadata from the storage section 115 or storage medium 120 (S1301) and separates the counter information i for the metadata added to the encrypted thumbnail image (S1302).

The encryption key generator 301 derives the session key Kthumb(i) for thumbnail from the counter information i and the initial session key Kthumb(0) for thumbnail stored in, for example, the medium list (S1303). The key generation method conforms to step S1204. The session key Kthum(i) for thumbnail is generated by, for example, executing an SHA-1 process for the initial session key Kthum(0) for thumbnail i times.

The data decryption section 302 decrypts the encrypted thumbnail image by using the session key Kthumb(i) for thumbnail (S1304) and displays the thumbnail image on, for example, the monitor of the operation section 121 (S1305).

Phase 5

In phase 5, the computer 101 permits use of encrypted image data stored in the storage medium 120 (S510). The photographer gives the storage medium 120 to the holder. Alternatively, the computer 101 receives encrypted image data via a network. A process procedure common to both cases will be explained below.

Figure 9:
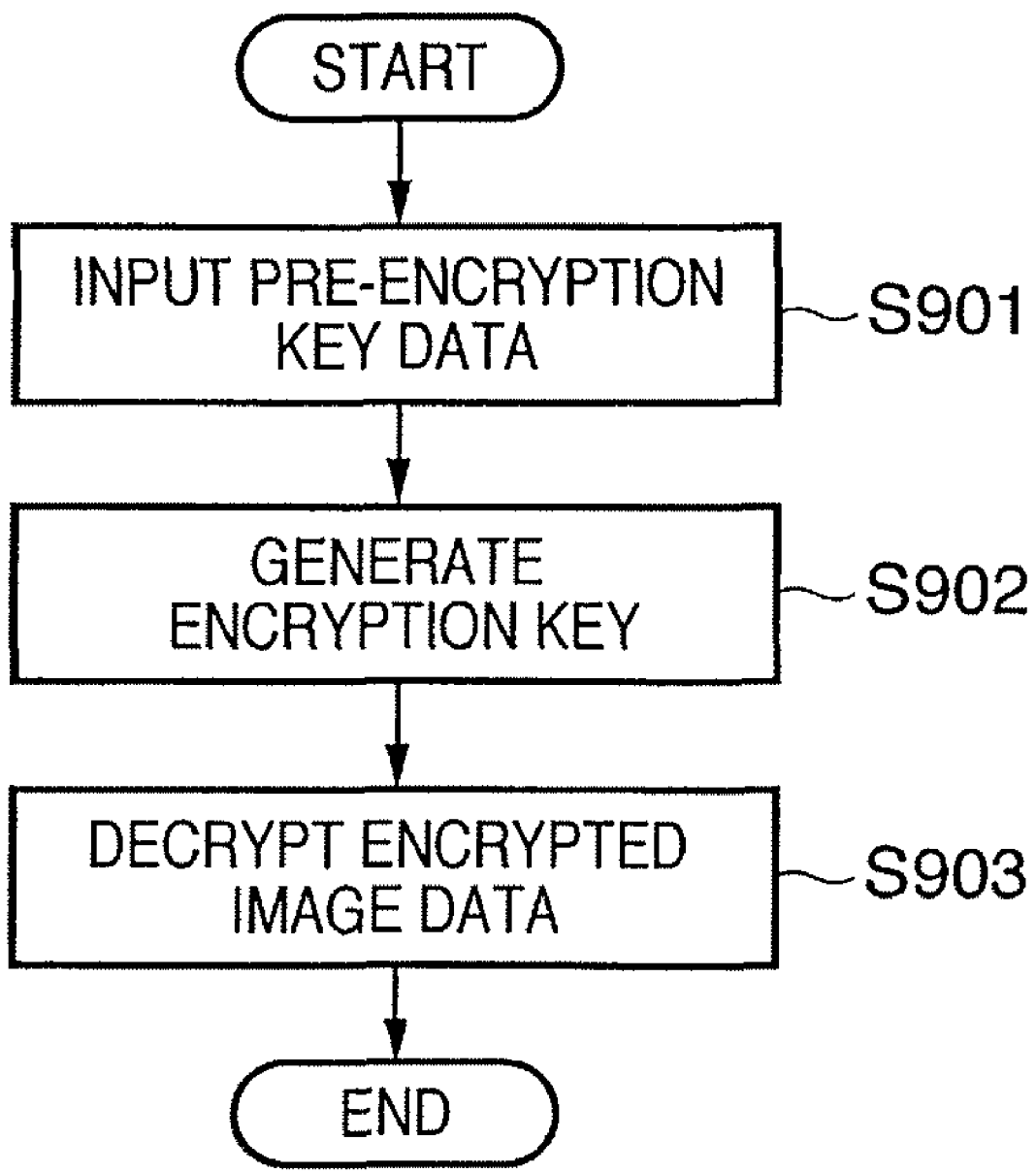
FIG. 9 is a flowchart illustrating an encrypted image data decryption procedure in a computer.

FIG. 9 is a flowchart illustrating an encrypted image data decryption procedure in the computer 101. This process is executed under the control of the CPU 105.

The CPU 105 receives a password (pre-encryption key data) via, for example, the keyboard 103 (S901). The CPU 105 generates an encryption key based on the pre-encryption key data by controlling the encryption key generator 301 of the decryption section 117 (S902). The encryption key generation method conforms to the method described in phase 1. Then, the CPU 105 decrypts the encrypted image data using the encryption key by controlling the data decryption section 302 (S903).

Figure 10:
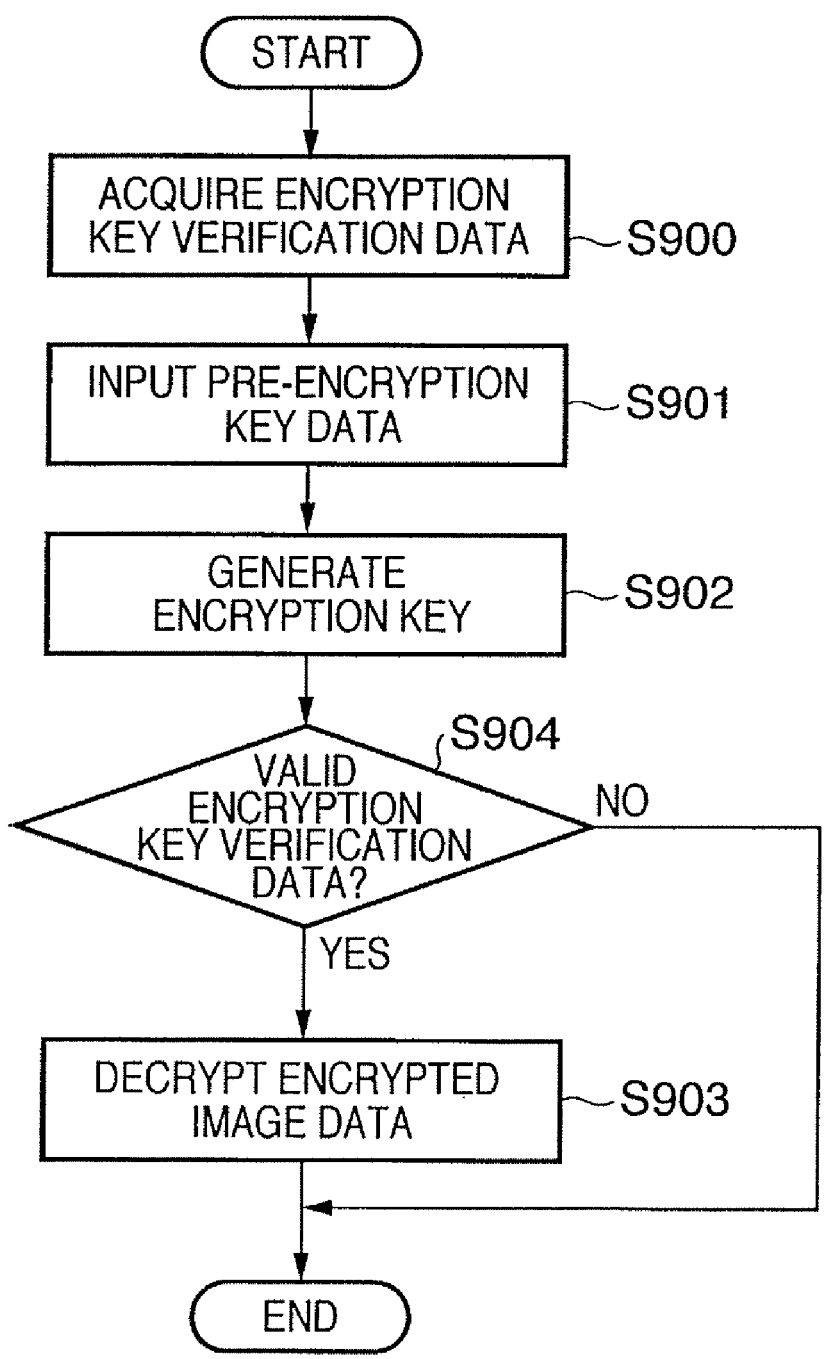
FIG. 10 is a flowchart illustrating the process shown in FIG. 9 which includes an additional process of verifying whether association between encryption key verification data and encrypted image data is correct upon receiving the encryption key verification data together with the encrypted image data.

FIG. 10 is a flowchart illustrating the process shown in FIG. 9 which includes an additional process of verifying whether association between encryption key verification data and encrypted image data is correct upon receiving the encryption key verification data together with the encrypted image data. This process is executed under the control of the CPU 105.

The CPU 105 acquires encryption key verification data (S900). After that, the CPU 105 receives pre-encryption key data (S901), generates an encryption key (S902), and authenticates the validity of the encryption key verification data (S904). The validity authentication is done in the same way as the process of the encryption key check section 404 of the digital camera 102. If the validity of the encryption key verification data is authentic, the encrypted image data is decrypted (S903). If the validity is not authentic, the process is ended. When the validity of the encryption key verification data is not authentic, time and efforts for insignificant encrypted image data decryption can be saved.

As described above, even when the photographer transfers captured image data to third parties (other than the content owner) erroneously or intentionally, the photographer and third parties cannot decrypt the encrypted image data. The transfer includes transmission via a network and copy of image data stored in the storage medium 120. It is therefore possible to protect the right of the content owner without any necessity of a special storage medium incorporating a copyright protecting mechanism even when the photographer does not coincide with the content owner.

Modification of Embodiment

In the first embodiment, when the digital camera 102 cannot acquire information necessary for encryption in encryption key verification data acquisition (S801) or encryption key generation (S804), the process stops. If the process stops, the photographer cannot take images. This impairs the convenience for the photographer and therefore requires some workaround.

If the digital camera 102 cannot acquire information necessary for encryption, non-encrypted image data is stored in the storage medium 120, instead of stopping the process. In addition, if the validity of encryption key verification data is not authentic (authentication has failed) because the digital camera cannot acquire the encryption key verification data, an encryption key is generated based on pre-encryption key data (S804). Then, the process skips the authentication process (S805), and encrypted image data is stored in the storage medium 120.

When the storage medium 120 allows coexistence of encrypted image data and non-encrypted image data, as described above, the convenience for the photographer improves.

The first embodiment does not consider a danger of illicit deletion of data from the storage medium 120. To prevent this, an access control mechanism for giving an access right to only a specific user is provided in the storage medium 120. Data erase can also be prevented by using a medium that allows only write, that is, a write once medium.

An information processing system that connects the computer 101 to the digital camera 102 has been exemplified above. However, the present invention is not limited to this and is also applicable to an information processing system that connects a plurality of arbitrary information processing devices such as a computer, printer, digital camera, scanner, video game player, portable information terminal, and portable phone. The present invention is also applicable to an information processing system that connects a plurality of information processing devices of the same type, for example, a plurality of computers.

For the encryption key verification data generation and authentication method, not only a cryptosystem by a public key cryptosystem including an RSA signature but also a cryptosystem by a common key cryptosystem and a MAC (message authentication code) generation scheme are applicable. As the cryptosystem, not only a cryptosystem (secret) by a public key cryptosystem including an RSA signature but also a cryptosystem by a common key cryptosystem can be used.

That is, any other encryption algorithm is applicable to the arrangement of the first embodiment.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-213944, filed Aug. 4, 2006, and Japanese Patent Application No. 2007-181450, filed Jul. 10, 2007, which are hereby incorporated by reference herein in their entirety.

What is claimed is:

1. A data processing apparatus comprising:
an input section, arranged to input information for encryption key generation;
a first encryption key generator, arranged to generate a first encryption key from the information for encryption key generation;
an image data generator, arranged to generate image data to be stored in a non-transitory storage medium;
a session key generator, arranged to generate a session key based on the first encryption key;
a first encryption section, arranged to encrypt the image data using the session key
a secondary image data generator, arranged to generate secondary image data of the image data;

a second encryption key generator, arranged to generate a second encryption key using information secretly held by the data processing apparatus;

a second encryption section, arranged to encrypt the secondary image data using the second encryption key; and a controller, arranged to store the image data encrypted by the first encryption section and the secondary image data encrypted by the second encryption section in the non-transitory storage medium, wherein the session key generator generates the session key using the first encryption key and a one-way function, the first time that it generates a session key, and generates the session key using the most recently generated session key and the one-way function, the second and subsequent times that it generates a session key, and destroys the session key which is used to generate a next session key, and wherein if different image data is encrypted, the first encryption section uses a different session key.

2. The apparatus according to claim 1, further comprising an authenticator arranged to acquire encryption key verification data from the non-transitory storage medium and authenticate, based on the verification data, validity of the information for encryption key generation.

3. The apparatus according to claim 2, wherein the encryption key verification data is a message authentication code for the information for encryption key generation.

4. The apparatus according to claim 2, wherein the encryption key verification data is a message authentication code for the first encryption key.

5. The apparatus according to claim 1, wherein the secondary image data is thumbnail image data of the image data.

6. The apparatus according to claim 2, wherein the controller stores the image data in the non-transitory storage medium without encryption if the authenticator has failed to authenticate the information for encryption key generation.

7. A method of processing data by a data processing apparatus, the method comprising the steps of:

inputting information for encryption key generation;

generating a first encryption key from the information for encryption key generation;

generating image data to be stored in a storage medium;

generating a session key based on the first encryption key;

encrypting the image data using the session key generating secondary image data of the image data;

generating a second encryption key using information secretly held by the data processing apparatus;

encrypting the secondary image data using the second encryption key; and storing the encrypted image data and the encrypted secondary image data in the storage medium, wherein in the session key generating step, the session key is generated using the first encryption key and a one-way function, the first time a session key is generated, and the session key is generated using the most recently generated session key and the one-way function, the second and subsequent times that a session key is generated, and the session key that is used to generate a next session key is destroyed, and wherein in the first encrypting step, if different image data is encrypted, a different session key is used.

8. The method according to claim 7, further comprising the step of acquiring encryption key verification data from the storage medium and authenticating, based on the verification data, validity of the information for encryption.

9. The method according to claim 8, wherein the verification data is a message authentication code for the information for encryption key generation.

10. The method according to claim 8, wherein the verification data is a message authentication code for the first encryption key.

11. The method according to claim 8, wherein the image data is stored in the storage medium without encryption if the acquiring and authenticating step has failed to authenticate the information for encryption key generation.

12. The method according to claim 7, wherein the secondary image data is thumbnail image data of the image data.

13. A non-transitory computer-readable medium storing a computer-executable program causing a computer to perform a data processing method, the method comprising the steps of:

inputting information for encryption key generation;

generating a first encryption key from the information for encryption key generation;

generating image data to be stored;

generating a session key based on the first encryption key;

encrypting the image data using the session key generating secondary image data from the image data;

generating a second encryption key using information secretly held by the computer;

encrypting the secondary image data using the second encryption key; and storing the encrypted image data and the encrypted secondary image data in the storage medium, wherein in the session key generating step, the session key is generated using the first encryption key and a one-way function, the first time a session key is generated, and the session key is generated using the most recently generated session key and the one-way function, the second and subsequent times that a session key is generated, and the session key that is used to generate a next session key is destroyed, and wherein in the first encrypting step, if different image data is encrypted, a different session key is used.

* * * * *